United States Patent
Benfield et al.

(10) Patent No.: US 9,261,423 B2
(45) Date of Patent: Feb. 16, 2016

(54) PIEZORESISTIVE LOAD SENSOR

(75) Inventors: David Benfield, Edmonton (CA); Walied Ahmed Mohamed Moussa, Edmonton (CA)

(73) Assignee: The Governors of the University of Alberta, Edmonton (CA)

(*) Notice: Subject to any disclaimer, the term of this patent is extended or adjusted under 35 U.S.C. 154(b) by 0 days.

(21) Appl. No.: 13/885,493

(22) PCT Filed: Feb. 7, 2012

(86) PCT No.: PCT/CA2012/000096
§ 371 (c)(1),
(2), (4) Date: May 15, 2013

(87) PCT Pub. No.: WO2012/106799
PCT Pub. Date: Aug. 16, 2012

(65) Prior Publication Data
US 2013/0239700 A1   Sep. 19, 2013

Related U.S. Application Data

(60) Provisional application No. 61/440,292, filed on Feb. 7, 2011.

(51) Int. Cl.
*G01L 5/16* (2006.01)
*G01L 1/18* (2006.01)

(52) U.S. Cl.
CPC .. *G01L 5/162* (2013.01); *G01L 1/18* (2013.01)

(58) Field of Classification Search
CPC ..................................................... G01L 5/16
USPC .......... 73/862.044, 862.628; 257/417; 438/50
See application file for complete search history.

(56) References Cited

U.S. PATENT DOCUMENTS

| | | | | |
|---|---|---|---|---|
| 6,378,384 B1* | 4/2002 | Atkinson et al. | .......... | 73/862.625 |
| 6,658,948 B2* | 12/2003 | Yoshihara et al. | ....... | 73/862.628 |
| 6,858,451 B2* | 2/2005 | Suzuki et al. | ................... | 438/14 |
| 7,192,819 B1* | 3/2007 | Padmanabhan et al. | ...... | 438/197 |
| 7,426,873 B1* | 9/2008 | Kholwadwala et al. | ........ | 73/818 |
| 7,633,131 B1* | 12/2009 | Padmanabhan et al. | ...... | 257/414 |
| 2002/0011637 A1* | 1/2002 | Kvisteroey et al. | ........... | 257/419 |
| 2006/0107761 A1* | 5/2006 | Meyer et al. | ............. | 73/862.044 |
| 2010/0102403 A1* | 4/2010 | Celik-Butler et al. | ........ | 257/415 |

(Continued)

OTHER PUBLICATIONS

Abbas, S. P., et al., "Real-Time, Non-vision Sensory Feedback during Minimally Invasive Surgery," TENCON 2009—2009 IEEE Region 10 Conference, Nov. 2009, pp. 1-6.

International Search Report mailed May 10, 2012, issued in corresponding International Application No. PCT/CA2012/000096, filed Feb. 7, 2012, 2 pages.

(Continued)

*Primary Examiner* — Lisa Caputo
*Assistant Examiner* — Jamel Williams
(74) *Attorney, Agent, or Firm* — Christensen O'Connor Johnson Kindness PLLC

(57) ABSTRACT

A three-axis load sensor utilizing four piezoresistive devices on a flexible silicon membrane is provided. The load sensor further includes a mesa disposed on the membrane substantially equidistant from the piezoresistive devices. A six-axis load cell is provided by placing a plurality of load sensors disposed on a substrate, the substrate configured to attach to an object wherein forces applied to the object can be measured and/or determined. The load sensors can be manufactured using bulk microfabrication techniques on a single crystal silicon wafer, and can detect normal and shear loading applied to the membrane.

16 Claims, 8 Drawing Sheets

(56) References Cited

U.S. PATENT DOCUMENTS

| | | | |
|---|---|---|---|
| 2010/0332155 A1* | 12/2010 | Puchades et al. | 702/50 |
| 2011/0197682 A1* | 8/2011 | Palmer | 73/862.045 |
| 2012/0144924 A1* | 6/2012 | Kotovsky | 73/777 |
| 2012/0174680 A1* | 7/2012 | Wade et al. | 73/721 |
| 2013/0215931 A1* | 8/2013 | Vaiana et al. | 374/178 |
| 2013/0319138 A1* | 12/2013 | Fuchs | 73/862.625 |
| 2014/0007705 A1* | 1/2014 | Campbell et al. | 73/862.628 |
| 2014/0245840 A1* | 9/2014 | Palmer | 73/862.045 |

OTHER PUBLICATIONS

Mei, T., et al., "Design and Fabrication of an Integrated Three-Dimensional Tactile Sensor for Space Robotic Applications," Technical Digest, Twelfth IEEE International Conference on Micro Electro Mechanical Systems, Jan. 1999, pp. 112-117.

Vedavathi, S., "Fabrication of Mems Pressure Sensor for Lab Course E3-222," <http://sindhu.ece.iisc.ernet.in/nanofab/twiki/pub/Main/PressureSensor/Fabrication_of_pressure_sensor.pdf> [retrieved Sep. 19, 2010], published on or before Sep. 19, 2010, 14 pages.

* cited by examiner

PIEZORESISTIVE LOAD SENSOR

CROSS-REFERENCE TO RELATED APPLICATIONS

This application claims priority of U.S. Provisional Patent Application Ser. No. 61/440,292, entitled "Piezoresistive Load Sensor", filed Feb. 7, 2011, and hereby incorporates the same provisional application by reference herein in its entirety.

TECHNICAL FIELD

The present disclosure is related to the field of microelectromechanical ("MEMS") load sensors, in particular, three-axis load sensors using piezoresistive sensing elements.

BACKGROUND

Microelectromechanical systems (MEMS) devices are particularly well suited for detection of loading in applications where space is limited or compact size is a necessity. MEMS sensors utilizing piezoresistive sensing schemes are commonly used for pressure and tactile sensing applications, both of which operate on the principle that the applied load creates a stress distribution in a piezoresistive sensor region, and electrical output signals are produced to allow quantification of this load [1-13]. Despite the similarities in the operation of these devices, differences in the geometric design allow devices with varying sensitivity and differing axes of detection to be developed.

Pressure sensors commonly make use of piezoresistors in Wheatstone bridge configurations [2, 4, 8-10]. This type of MEMS sensor detects deformation of a membrane in response to a pressure differential, and as such is only sensitive to 1D input. Piezoresistive membrane devices have also been used to measure interfacial forces [3, 5-7, 11-14]. In these devices, multiple sensing elements can be implemented on each membrane to resolve shear and normal loads in combination. This 3D detection is achieved by examining localized stress distributions that allow differentiation between the load directions. Resolving shear and normal loads with one compact device is of particular interest for tactile applications for robots, force feedback apparatus, as well as for surgical applications [1, 15-21].

A challenge associated with 3D interfacial sensor development is achieving comparable sensitivity in the detection of shear and normal forces. Several groups have reported devices with lower sensitivity in the shear directions [1, 7, 11, 14, 21], while other groups have achieved higher sensitivity in the shear directions [3, 6, 12, 15, 19]. The design used to evaluate shear and normal sensitivities was a square membrane constructed of single-crystal silicon with four piezoresistors doped onto the top surface. This design was chosen for its inherent strength, ease of manufacture, and versatility in terms of varying the sensitivity. The four piezoresistors allow the normal and two shear components of applied load to be resolved independently, providing sufficient information to recreate the original loads applied. This design also provides space to apply a mesa, or block, to the top surface of the membrane to further enhance the shear sensitivity. Other research groups have used mesas in various configurations to enhance the sensitivity of their devices [13, 15, 16].

Four-terminal piezoresistive sensing elements or devices can be chosen to detect membrane stress distributions. Four-terminal devices can provide temperature compensation and can be compact, allowing localized stress detection while maintaining larger electrical connection and contact via sizes as compared to a full Wheatstone bridge [22, 23]. Gridchin et al. determined that the theoretical maximum sensitivity ratio of a four-terminal sensor compared to a full Wheatstone bridge is 0.75, however, the actual sensitivity ratio may be higher if any arms of the bridge are in a region of lower stress, thus giving the four-terminal sensor comparable sensitivity to a Wheatstone bridge [24]. Consistency in modeling and manufacturing of the four-terminal sensing elements allowed the circuit noise to stay consistent between devices, allowing better sensitivity comparisons to be made [25, 26].

The changing of specific geometric parameters of an interfacial force sensor can affect shear and normal sensitivities. The main parameters that can be varied are membrane thickness and mesa height, as well as load application sites and piezoresistor locations on the membrane's surface.

It is, therefore, desirable to provide a MEMS force sensor that overcomes the shortcomings in the prior art, and to improve the shear to normal sensitivity ratio of interfacial devices.

SUMMARY

A three-axis or three-dimensional load sensor comprising piezoresistive sensing elements is provided. In some embodiments, the load sensor can comprise a n-type silicon membrane substrate having a rectangular or square configuration. The load sensor can further comprise a plurality of piezoresistive sensing elements disposed on the membrane in a spaced-apart configuration around the perimeter of the membrane. In some embodiments, a piezoresistive sensing element or device can be disposed near each edge of the membrane, wherein an open space or area is defined between the piezoresistive sensing elements or devices. In further embodiments, each piezoresistive sensing element or device can comprise a p-type silicon four-terminal piezoresistive gauge. In other embodiments, each piezoresistive sensing element or device can comprise a two-terminal piezoresistor. In further embodiments, four such piezoresistive sensing elements or devices can be disposed in a spaced-apart configuration around the membrane, and can further be electrically configured or operatively connected as a Wheatstone bridge, as well known to those skilled in the art. In other embodiments, a solid structure or "mesa" can be placed or disposed on the membrane in the open area or space defined between the piezoresistive devices to improve the shear to normal sensitivity ratio of the load sensor.

In some embodiments, a solution for a compact load cell comprising six-axis sensitivity is provided. In some embodiments, the load cell can comprise a silicon substrate upon which a plurality of the load sensors can be disposed in an array or in a spaced-apart configuration (a "constellation" of load sensors). In some embodiments, such a load cell can allow three-dimensional forces and moments to be detected using an array of the load sensors operating in parallel. In some embodiments, a load cell can comprise four load sensors operating in parallel. In some embodiments, each of the membrane devices can comprise of a square or rectangular membrane constructed out of single crystal silicon with four piezoresistive detection regions created near the center of the membrane edges. Force application to the membrane, either applied directly or through a mesa, can cause deformation to the membrane and subsequent voltage outputs from the piezoresistive devices or gauges. These voltage outputs can be proportional to the shear and normal force loads applied to each membrane. Multiple membranes can then be combined in a package to allow six-axis load sensitivity for the complete load cell.

In some embodiments, the load cell can be sensitive to three-dimensional forces and moments, allowing for six-axes of load detection. The interfacial membrane design of the load cell can allow force and moment ranges to be adjusted by altering membrane thickness and piezoresistor doping levels. Additionally, force and moment ranges can be adjusted to allow increased sensitivity in particular directions. Typical force ranges can be 1 kN and typical moment ranges can be 4 kN-mm. The high sensitivity of the MEMS components used in the sensor can allow the load ranges to be achieved with minimal sensor deflection.

For the purposes of this specification, the load sensors and load cells described herein can be comprised of semiconductor material. As described herein, the semiconductor material can comprise silicon, as well known to those skilled in the art. As further described herein, the load sensor membranes can comprise n-type silicon and the piezoresistive devices can comprise p-type silicon. It is obvious to those skilled in the art that, in other embodiments, the membranes can comprise p-type silicon and the piezoresistive devices can comprise n-type silicon. It is further obvious to those skilled in the art that the membranes and piezoresistive devices can comprise other functionally equipment semiconductor material, either in combination with silicon or in replacement of silicon, such as gallium arsenide and other semiconductor materials that can function as membranes and piezoresistive devices described herein, and as well known to those skilled in the art.

In some embodiments, the MEMS membrane sensors can be approximately 2 mm×2 mm×0.5 mm, and can facilitate a packaged device with a volume of less than 1 $cm^3$. The inclusion of multiplexing, transmitting, transceiving or power componentry in alternate embodiments of the device can limit how small the device can be although the compactness of the device as provided can provide a substantial improvement in terms of how small the device can be made over conventional prior art load cell technology.

In some embodiments, the package for the load cell can be biocompatible and compact compared to commercially available load cells. In further embodiments, the operation of the load cell can comprise a set of 16 output voltages (an output voltage from each of the four piezoresistors on the membranes of the four load sensors that make up some embodiments of the load cell) that can be combined to achieve the overall sensitivity of the device in the six-axes of interest. These 16 voltage outputs can be combined in linear and/or nonlinear matrix equations to produce the three-dimensional force and moment information that can then be displayed or stored. The balance of a system for the load cell package can comprise of power and multiplexing and/or transmitting or transceiving components that can transmit the data produced by each piezoresistor to a personal computer or other external data collection point as well known to those skilled in the art. In some embodiments, data manipulation and storage can be performed externally to maintain the compact size of the load cell package.

In some embodiments, calibration of this load cell can require quantification of its response to 3D forces and moments. A calibration frame was developed which allowed variable forces and moments to be applied to the load cell, producing sensitivity equations incorporating the 16 output voltages for each of the six-axes of detection. As the four pads on the sensor array can be the same, symmetry can be used to perform the calibration regime in two stages: the four voltage outputs from each pad can be first resolved into shear and normal forces, and then the outputs from the four pads can be combined into 3D force and moment information for the overall device.

In some embodiments, the signal outputs from the piezoresistors are voltages that can be easily transmitted via a wireless system. Commercially available wireless components, as well known to those skilled in the art, can be used for this purpose. Due to multiple signals produced in the detection of the six load axes, a multiplexer can be used to combine the signal outputs and lower the load on a wireless transmitter.

In operation, the load cell device can be used be in a number of applications. In some embodiments, the device can be used in biomedical applications as the device can comprise flexible circuit boards made of biocompatible materials and adhesives, as well known to those skilled in the art, to hermetically seal and protect the silicon sensing components of the device. In some embodiments, the device can be used as a six-axis load cell implemented in surgical instrumentation, that is, the device can be used during surgeries including, but not limited to, as a sensor array to characterize in situ loads during scoliosis correction surgery as detailed a paper published by the within inventors entitled: "Development of a MEMS-based sensor array to characterize in situ loads during scoliosis correction surgery", D. Benfield et al., *Computer Methods in Biomechanics and Biomedical Engineering*, Vol. 11, No. 4, August 2008, 335-350. This paper is incorporated by reference into this application in its entirety.

In other embodiments, the load sensor can be used as load cells in a number of applications including, but not limited to, permanent implants, instrumented braces for teeth, load detection in scoliosis braces, load detection in robotics and material characterization devices. In other embodiments, the load sensors and/or the load cells can be used in other applications requiring or comprising surfaces that can detect load forces exerted against the surfaces, which can include, but are not limited to, video touch screens for computing or electronic devices and appliances, load cells, peripheral devices for computing devices or computers such as mouse pointing devices, video game controllers, load cells used in dental or orthodontic applications such as the in straightening or correcting the displacement of teeth, and load cells used in touch sensors for robotic devices and for prosthetic devices or limbs.

Broadly stated, in some embodiments, a microelectromechanical system ("MEMS") load sensor is provided for detecting loads in three axes, the load sensor comprising: a flexible silicon membrane substrate comprising a top surface; and a plurality of piezoresistive devices disposed on the top surface, the piezoresistive sensors disposed in a spaced-apart configuration around a perimeter of the top surface.

Broadly stated, in some embodiments, a load cell for detecting loads in six axes is provided, the load cell comprising: a load cell substrate configured for disposition on an object; a plurality of microelectromechanical system ("MEMS") load sensors for detecting loads in three axes disposed on the load cell substrate, each load sensor further comprising: a flexible silicon membrane substrate comprising a top surface, and a plurality of piezoresistive devices disposed on the top surface, the piezoresistive devices disposed in a spaced-apart configuration around a perimeter of the top surface, each piezoresistive device configured to produce an output voltage.

Broadly stated, in some embodiments, a load cell system for detecting loads in six axes is provided, the system comprising: a load cell substrate configured for disposition on an object; a plurality of microelectromechanical system ("MEMS") load sensors for detecting loads in three axes disposed on the load cell substrate, each load sensor further comprising: a flexible silicon membrane substrate comprising a top surface, and a plurality of piezoresistive devices disposed on the top surface, the piezoresistive devices disposed in a spaced-apart configuration around a perimeter of the top surface, each piezoresistive device configured to produce an output voltage; and means for combining or multiplexing the output voltages from the plurality of piezoresistive devices.

DETAILED DESCRIPTION OF EMBODIMENTS

Sensor Design and Manufacture

Figure 1A:
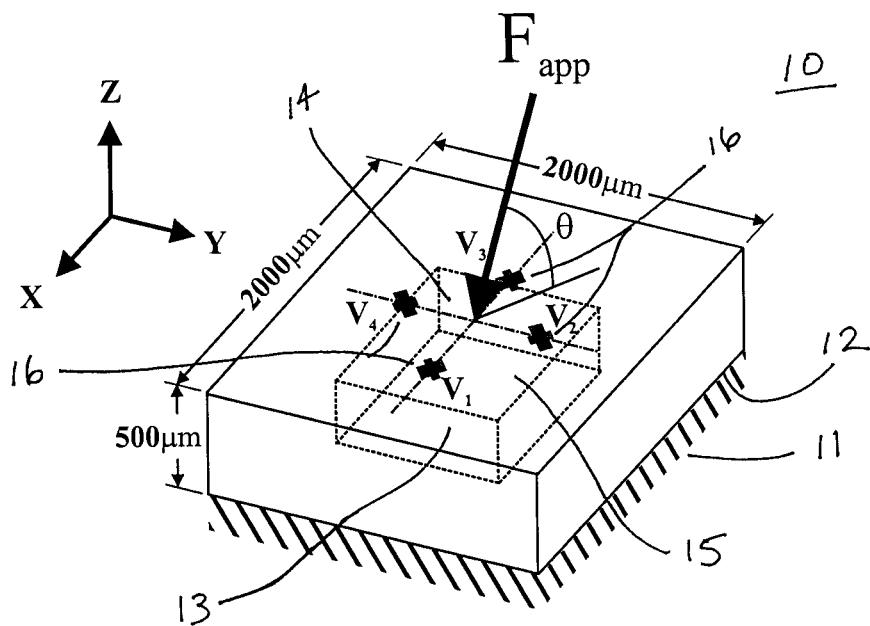
FIG. 1a is a top perspective view depicting a three-axis load sensor.
Figure 1B:
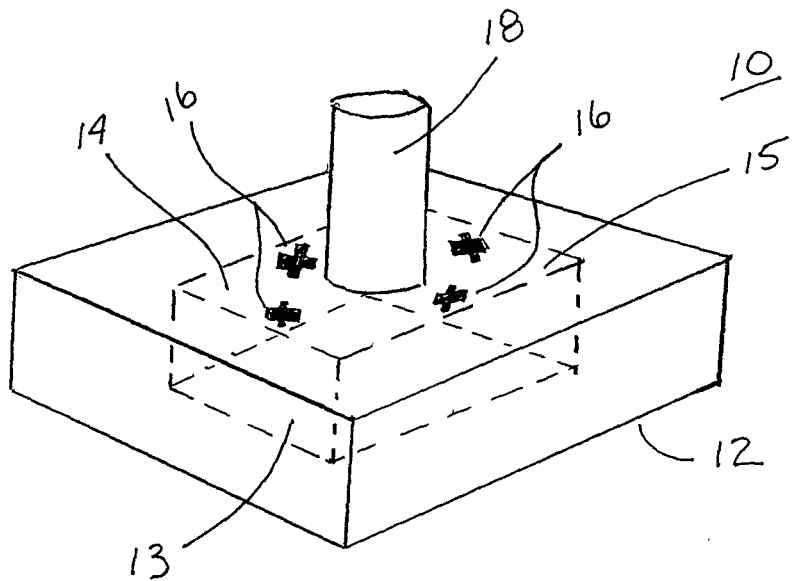
FIG. 1b is a top perspective view depicting the load sensor of FIG. 1a with a cylindrical mesa.
Figure 1C:
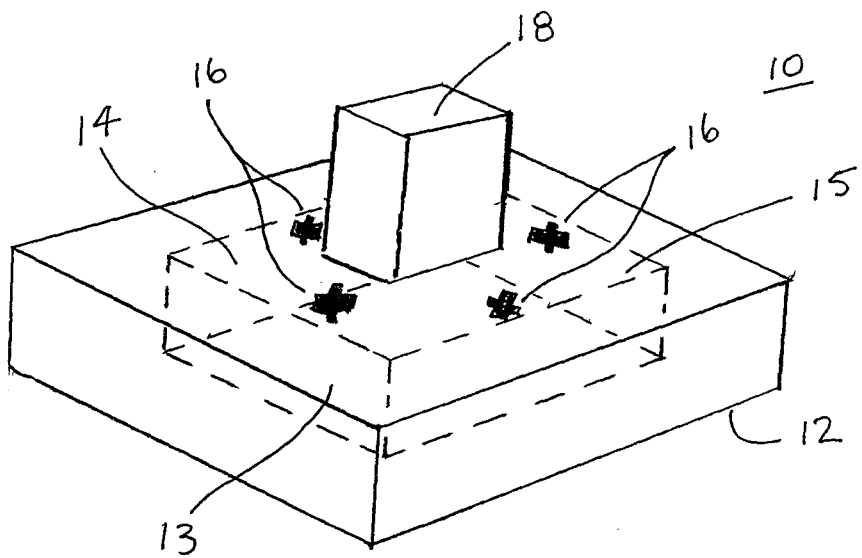
FIG. 1c is a top perspective view depicting the load sensor of FIG. 1a with a rectangular solid mesa.

A 3D interfacial MEMS load sensor comprising piezoresistive sensing elements is provided. In some embodiments, load sensor 10 can comprise a single-crystal silicon wafer with cavity 13 etched into bottom surface 12 to create membrane 14, as illustrated in FIG. 1. In some embodiments, four piezoresistive devices 16 can be fabricated onto top surface 15 of membrane 14. Each piezoresistive device 16 can comprise a p-type four-terminal gauge placed near the middle of the membrane edges in order to capture the greatest stresses induced during deflection. In other embodiments, a mesa can be affixed to center of membrane 14 between the piezoresistive devices 16. One embodiment of an interfacial sensor 10 is shown schematically (without a mesa attached) in FIG. 1a. In some embodiments, sensor 10 can comprise cylindrical mesa 18 disposed on membrane 14, as shown in FIG. 1b. In further embodiments, sensor 10 can comprise rectangular solid mesa 18 disposed on membrane 14.

Finite Element Analysis Process

Finite element analysis ("FEA") can be used as a primary design tool to simulate the performance of 3-axis sensors 10. FEA can allow for geometric changes and other properties to be examined for their effect on shear and normal sensitivity more quickly than in a manufacturing run. Appropriate FEA parameters can be determined by examining contact, diaphragm deflection and piezoresistive problems with known analytical solutions which used comparable numerical methodologies [27]. The level of multiphysics simulation used can allow input voltages to be applied along with structural loads and output voltages to be produced at the terminals of the four-terminal piezoresistive devices 16.

Analyses were performed using ANSYS® Multiphysics™ FEA software. Structural (non-electrical) components can be meshed in three dimensions ("3D") by using a 10-node, tetrahedral, structural solid element, capable of meshing a wide variety of shapes. Piezoresistive components can be meshed with elements corresponding to the non-electrical elements with additional degrees of freedom for the electrical properties. The FEA can model silicon as an orthotropic material with stiffness tensor coefficients c11: 165.7 Gpa; c12: 63.9 Gpa; and c44: 79.6 GPa. The piezoresistive (p-type) device 16 was initially defined by $\pi11$: 65 $TPa^{-1}$; $\pi12$: $-11$ $TPa^{-1}$; and $\pi44$: 1381 $TPa^{-1}$ and the resistance was initially defined as $\rho$: 7.8 $\Omega$-cm. Along with examining the effect of geometric changes to shear and normal sensitivity, FEA can allow material properties to be adjusted to more accurately match manufactured devices or, conversely, to determine parameters to meet specific performance goals.

Microfabrication Process

Figure 2:
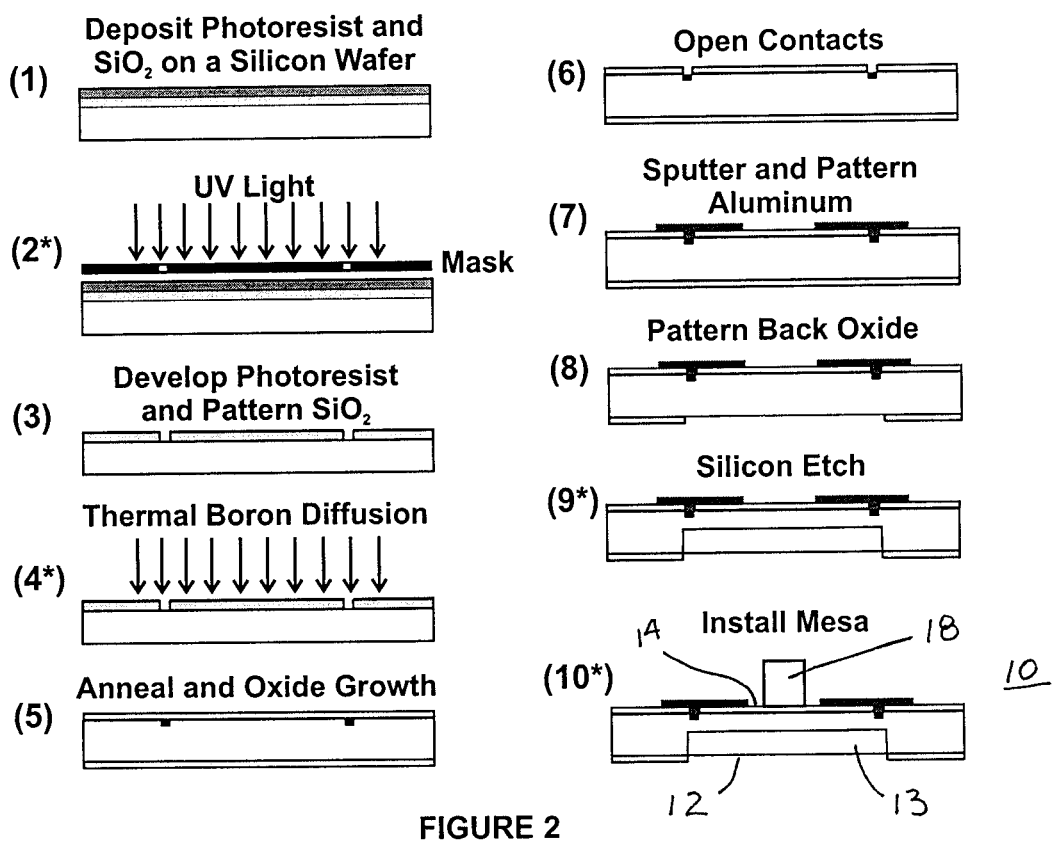
FIG. 2 is a block diagram depicting the manufacturing process of the load sensor of FIG. 1.

A microfabrication process was developed for prototyping the piezoresistive interfacial load sensors 10. Prototypes were used to verify sensitivity trends determined using FEA, as well as to identify sources of anomalous device behavior. A simplified schematic of the manufacturing procedure used is shown in FIG. 2 with the individual steps numbered. The sensors 10 were built on 308-309 µm thick n-type (100) silicon substrates with a background resistivity of 1-10 $\Omega$-cm. The substrates were initially cleaned using piranha and ("buffered oxide etch") BOE and a 1200 nm thermal oxide ($SiO_2$) layer was grown. Step 1 in FIG. 2 shows a substrate with $SiO_2$ and photoresist layers applied. Photolithography operations of exposing, developing and etching portions of the photoresist layer were then performed (step 2). Alignment marks were created in the substrate using BOE and a shallow (<5 µm) resistive ion etch ("RIE"). Diffusion windows were then opened through the $SiO_2$ using BOE to prepare the substrate for doping (step 3). For maximum sensitivity, piezoresistive devices 16 were defined to have a 2:1 length to width ratio with their long axes aligned with the [1 1 0] direction on the (1 0 0) plane [22, 23]. Thermal boron doping was performed at 935° C. for 1 hour followed by a removal of the remaining oxide layer with BOE (step 4). Annealing and 600 nm of wet thermal oxide growth were performed at 1000° C. for four and two hours, respectively (step 5). These steps produced piezoresistive devices 16 with junction depths of 1000 nm and surface concentrations of $5\times10^{19}$ $cm^{-3}$ Surface concentration values were estimated numerically using the complementary error function and Gaussian diffusion equations [28], and experimentally using sheet resistance measurement structures [29-31]. Photolithography and BOE were then performed to expose the piezoresistive devices 16 at specific contact points (step 6). A 500 nm aluminum layer was then sputtered on and patterned to provide electrical connectivity (step 7). The membranes 14 were then created by making cavity 13 on the backside of the substrate with a DRIE etch (steps 8 and 9). The thinnest membranes achieved were approximately 65 μm thick and had nearly vertical cavity walls. The silicon substrate was then diced to separate the individual sensors 10. After dicing, mesas 18 were attached to the membrane surface using a physical adhesion process or an additional lithography step with a photoresist such as SU-8 (step 10).

The photolithography mask set included devices with various membrane and piezoresistor geometries. Changing the mask set could allow further adjustments to these geometries, as illustrated in step 2 of FIG. 2. In addition, piezoresistive coefficients may be changed by altering the doping time, temperature, and source, as illustrated in step 4. Step 9 indicates that adjusting the DRIE parameters and time for the backside etch can alter the membrane thicknesses. Mesa shape, size and position are also parameters that can easily be adjusted using this manufacturing procedure (step 10). These adjustments to the microfabrication process can allow production of load sensor devices with varying geometric and material properties. Varying these parameters can have an effect on the shear and normal sensitivity of a load sensor.

Characterization

Figure 3:
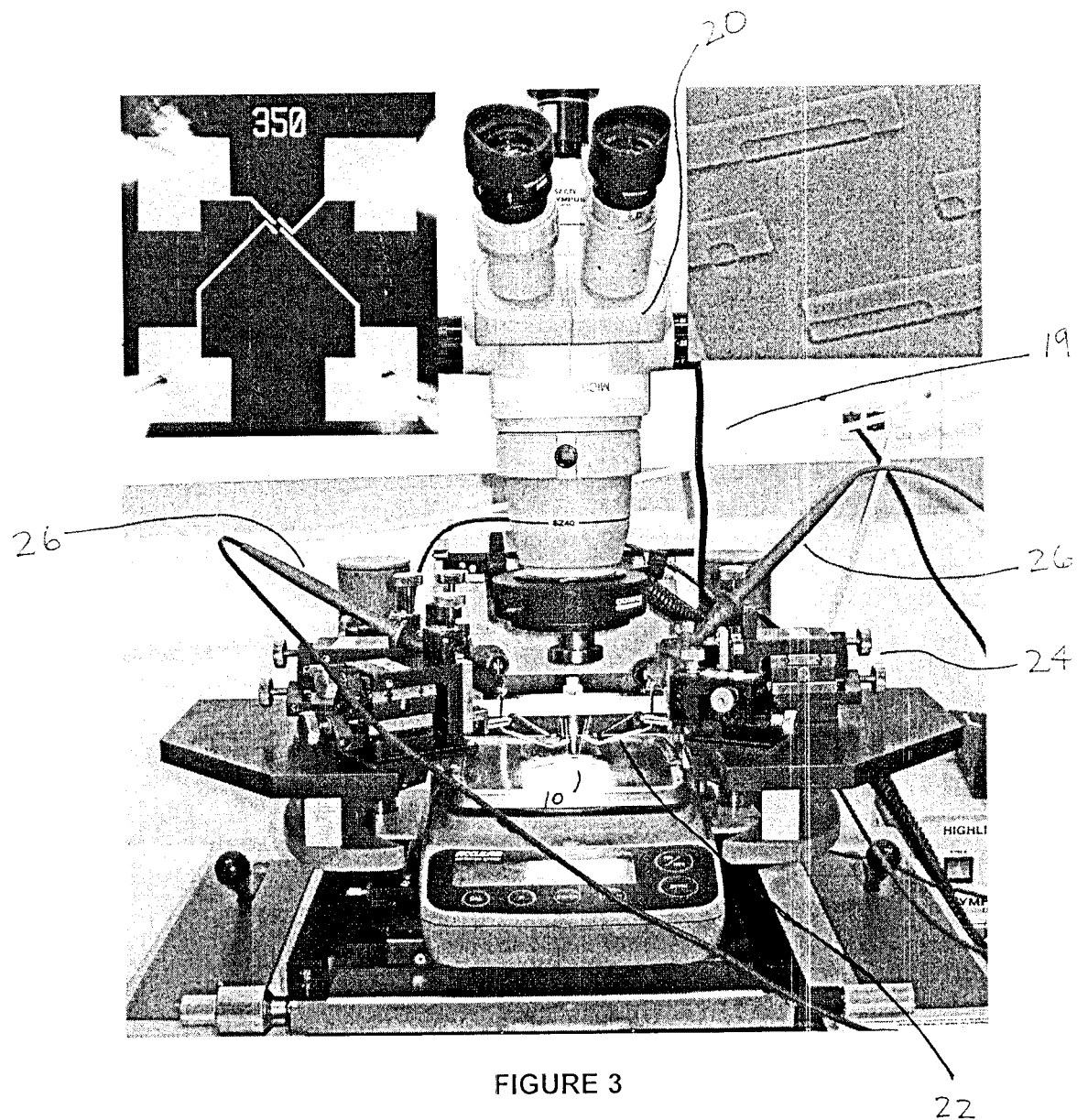
FIG. 3 is a photograph depicting a microscope probing station used in the testing of three-axis load sensors.

A characterization regime can be developed in order to compare the shear and normal sensitivity values calculated with FEA to the performance of the prototype devices. A microscope probing station 19 can be modified to allow characterization of diced devices. FIG. 3 shows a photograph of one embodiment of a modified station 19. This probing station 19 can comprise a stereomicroscope 20 and a ferromagnetic probe platform 22 suspended above an x-y translation stage 24. Three-axis linear adjustment probes 26 can be magnetically attached to the platform 22, to allow accurate electrical connections and force application to be made to the prototype sensors 10. A balance placed on the translation stage 24 can enable normal forces applied by the probes 26 to be measured. The response of the sensors 10 can be evaluated by comparing the voltage output of the four-terminal piezoresistive devices 16 to the output of the electronic balance. The limited number of probes 26 on the probe station 19 meant that the piezoresistive devices 16 on each membrane 14 had to be examined for their responses sequentially. This added time during characterization but allowed testing of devices in a pre-packaged state.

In order to collect data on the shear and combined sensitivities of the devices, a wedge can be used to hold the sensors at a known angle while the load was applied normal to the balance. The wedges were constructed out of an insulating acrylic material and were fabricated with known angles of 20° and 45°. A wedge was fixed to the balance on the stage and the sensor being tested was then affixed to the wedge. Alignment, electrical connectivity, and load application were then performed as in the normal sensitivity characterization.

Accurate shear load application to the load sensors 10 was difficult due to the single crystal silicon membrane surfaces (without mesas attached) having a low coefficient of friction. Deformation of the probes during force application also caused variation in the load vectors at their tips during characterization. In order to compensate for these effects, a stiffer load application device was built. This stiffened load application tool bridged two individual probes with a solid beam and applied loads using a 6.35 mm pin threaded into the midpoint of this beam. This application tool was rigid enough to apply shear forces at its tip and properly characterize the sensors for the shear and combined loading cases. Ensuring that unwanted movement between the probes, mesa, membrane surface, wedge and balance is minimized was also important for accurate characterization. Alternative solutions to these problems, such as the design discussed in [12], have been discussed in literature and may be preferable if shear loads are applied exclusively.

Discussion and Results

A prototype load sensor 10 device with a 2000 μm×2000 μm×90 μm square membrane 14 was characterized for response to normal loading. The piezoresistive devices 16 on this load sensor 10 were 200 μm×100 μm, spaced 700 μm from the center of the membrane 14, doped with boron to a concentration of approximately $5 \times 10^{19}$ cm$^{-3}$, and had a 5V source voltage applied. A variable normal (downward) load was applied in the center of the membrane and voltage outputs were recorded. These experimental results have been compared to a FEA simulation of a device modeled with similar properties in FIG. 4.

Figure 4:
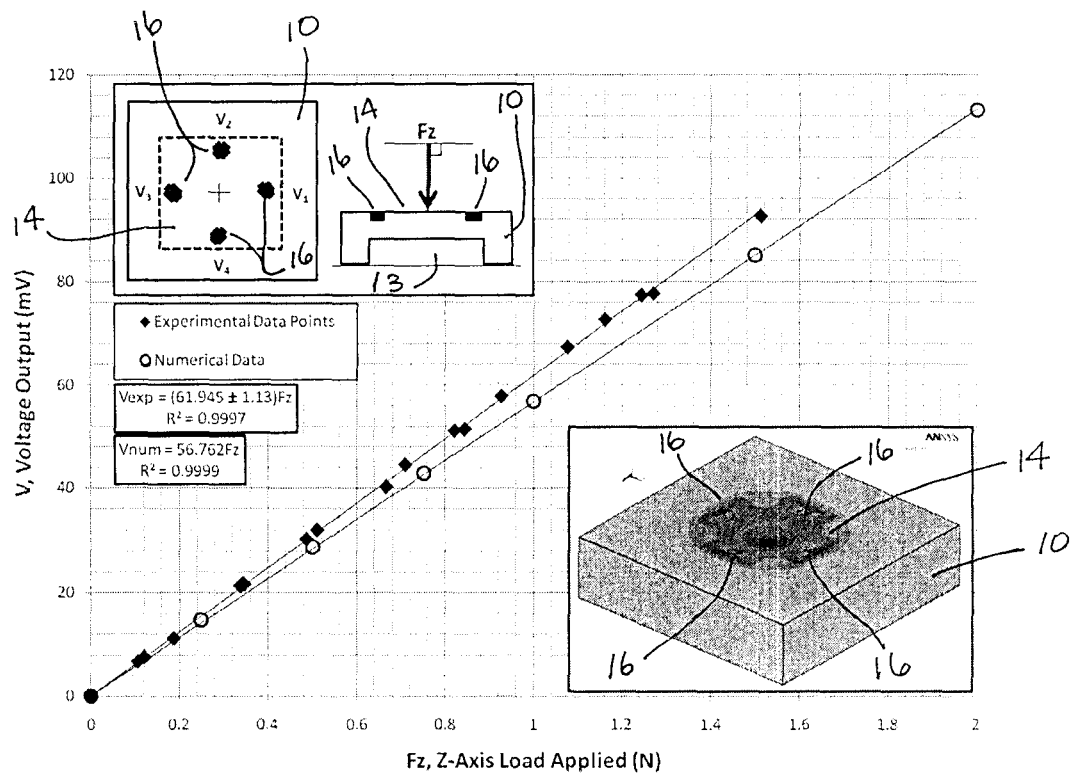
FIG. 4 is an X-Y graph depicting simulated and experimental sensor responses to a centralized downward load.

For the centralized normal load, Fz, cases shown in FIG. 4, both experimental and numerical characterization produced similar and nearly linear voltage responses to load application. In addition, outputs from all four piezoresistive devices 16, $V_1$-$V_4$, were coincident. A degree of non-linearity is expected in the strain response at these regions, and may been examined using membrane deflection theory [32] and has been discussed in the analysis of a similar device [33]. In the experimental case, an offset voltage (which was removed in post-processing for FIG. 4) was produced and the sensitivity was higher. The offset voltage was caused by asymmetry created by mask layer misalignment during manufacturing, and variation in doping concentration and membrane thickness caused the alteration in sensitivity. There may also some variation in the experimental data caused by load misalignment, which is discussed further below.

Figure 5:
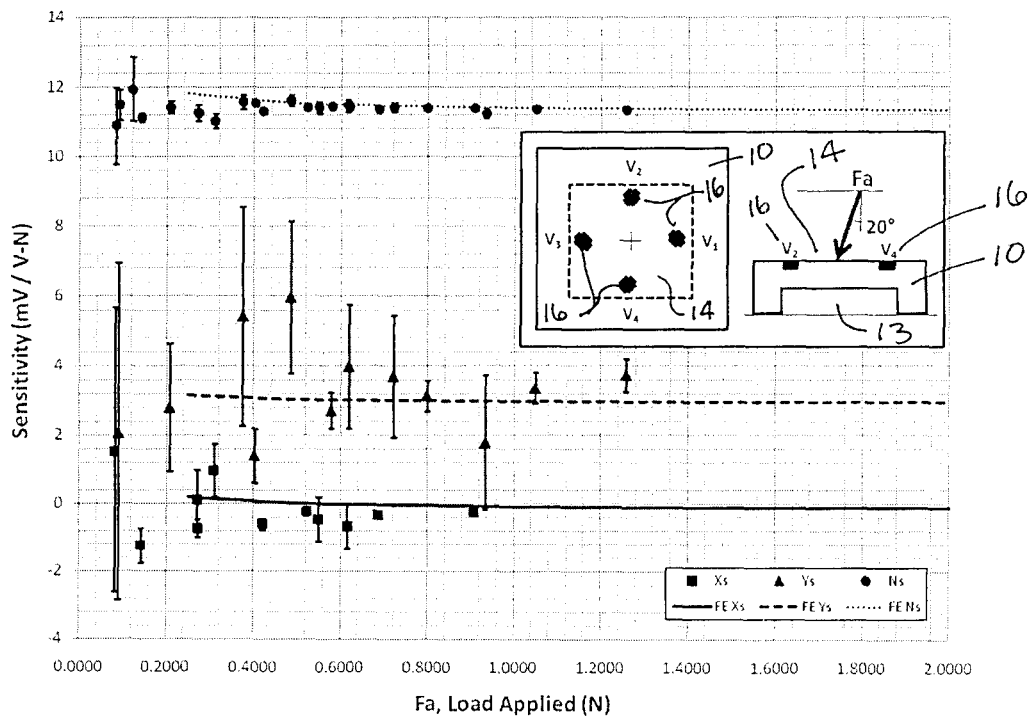
FIG. 5 is an X-Y graph depicting simulated and experimental sensitivity responses to a 20° angled point load on a load sensor with no mesa attached.

A combined load equivalent to a force applied at 20° from vertical, pointing toward sensor $V_2$, was applied to the experimental prototype and FEA model evaluated in FIG. 4. Output results are reasonably linear, however, differences between the responses of the $V_2$ and $V_4$ piezoresistive devices 16 and the $V_1$ and $V_3$ piezoresistive devices 16 are found that may be used to quantify the applied shear load components. Formulas for normal, X-shear and Y-shear sensitivity ($N_S$, $X_S$ and $Y_S$, respectively) are shown in (1). $V_1$-$V_4$ represent the individual piezoresistor outputs, $V_{IN}$ represents the source voltage, and $F_{APP}$ represents the force applied in the direction of detection. For situations where the applied force in a particular direction is zero, the total force applied is used and the calculated sensitivity in that direction is indicative of error. FIG. 5 compares the numerical and experimental responses to a 20° angled load, Fa, for the prototype load sensor 10 in terms of sensitivities.

$$N_S = \frac{V_1 + V_2 + V_3 + V_4}{4 \cdot V_{IN} \cdot F_{APP}}, \quad X_S = \frac{V_3 - V_1}{V_{IN} \cdot F_{APP}}, \quad Y_S = \frac{V_4 - V_2}{V_{IN} \cdot F_{APP}}$$

The simulated results shown in FIG. 5 produced average sensitivities of $N_S$=11.5 mV V$^{-1}$N$^{-1}$, $Y_S$=3.0 mV V$^{-1}$ N$^{-1}$, and $X_S$=0.0 mV V$^{-1}$ N$^{-1}$. Experimental results were supportive of the numerically calculated normal sensitivity; however, experimental error in the shear sensitivity results, particularly at the lower force values of Fa, obscured the correlation between numerical and experimental results. In order to detect shear loads more accurately with these devices, the shear to normal sensitivity ratio ($Y_S$/$N_S$) was increased.

Mesa Implementation

Affixing a mesa 18 to the top surface 15 of the membrane 14 was found to have very significant effects to the shear sensitivity of the devices. A cylindrical mesa 18 with a 600 µm diameter and 400 µm height was added to a prototype device with dimensions similar to the device evaluated above. The loading response of this device was compared to a numerical model with similar properties. Results of this comparison are shown in FIG. 6.

Figure 6:
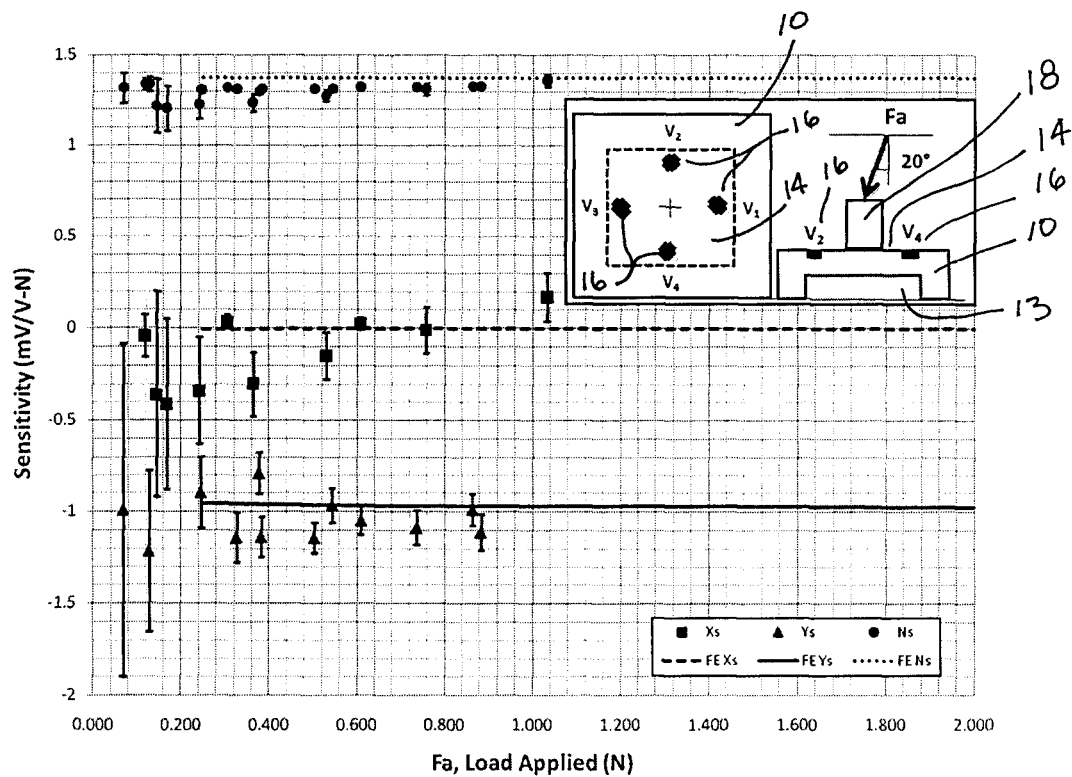
FIG. 6 is an X-Y graph depicting simulated and experimental sensitivity responses to a 20° angled point load on a load sensor with a mesa attached.

The shear to normal sensitivity ratio of the device evaluated in FIG. 6 is approximately $Y_S/N_S=-0.8$. This represents a substantial absolute increase from the results without a mesa shown in FIG. 5, where $Y_S/N_S=0.26$, and also changes the sign of the sensitivity ratio. Overall sensitivity of this load sensor 10 was lower, with $N_S=1.4$ mV $V^{-1}$ $N^{-1}$, $Y_S=-1.0$ mV $V^{-1}$ $N^{-1}$, and $X_S=0.0$ mV $V^{-1}$ $N^{-1}$, which may be the result of a thicker membrane 14 (130 µm) and a higher surface concentration ($>1\times10^{21}$ cm$^{-3}$) after doping and drive-in. Despite lower overall sensitivity, the increased shear to normal sensitivity ratio allowed better correlation between numerical and experimental results to be made for more accurate experimental detection of shear loading.

To establish trends in device performance, FEA was used to vary parameters, such a mesa height, individually. A reasonable correlation was achieved between experimental and numerical results, indicating that the use of FEA to estimate trends in device performance is acceptable. For ease of parametric comparison, square membranes 14 with edge lengths of 1000 µm were used to evaluate shear and normal sensitivity values. Piezoresistive devices 16 were defined to be 100 µm×50 µm and were given the low-doped piezoresistive coefficients as specified above.

Figure 7:
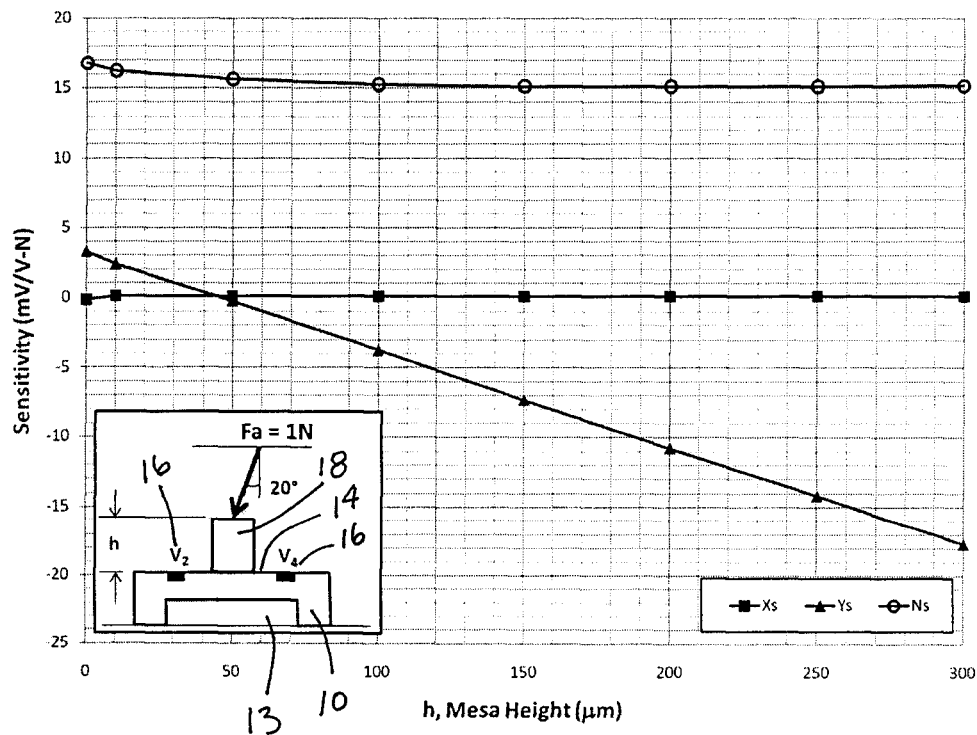
FIG. 7 is an X-Y graph depicting simulated sensitivity variation as the height of the mesa of FIG. 6 is adjusted.

A cylindrical mesa 18 was added to an FEA model with a membrane thickness of 65 µm to examine sensitivity values as the height of the mesa 18 was changed. Results of this analysis are plotted in FIG. 7. This analysis showed that an absolute increase in shear sensitivity occurs with increased height of the mesa 18, but this does not substantially change the normal sensitivity. It is also significant to note that the calculated shear sensitivity was negative for mesa heights above 50 µm. This sign change was also detected in experimental results, and occurs because strains in the membrane surface due to shear loading act to oppose strains due to moment loading created by the height of the mesa 18. This simulation indicated that, in some embodiments, a mesa 18 can be at least 100 µm in height for devices with 1000 µm edge lengths to achieve a positive effect on device shear sensitivity.

Membrane Thickness

Figure 8:
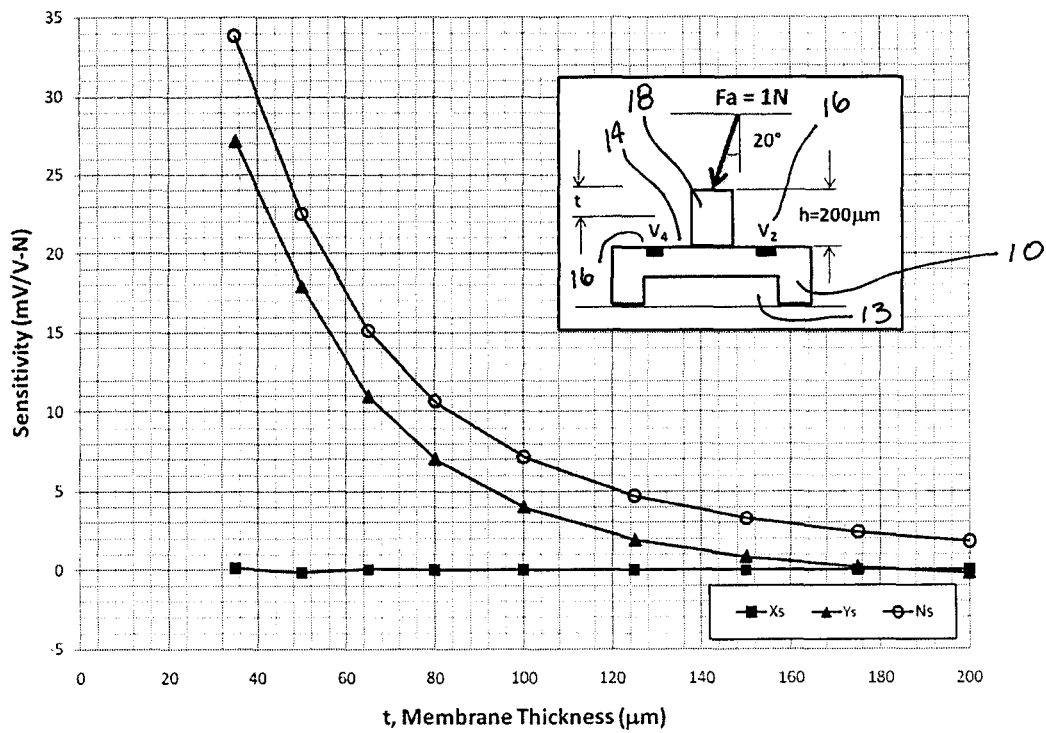
FIG. 8 is an X-Y graph depicting simulated sensitivity variation as the thickness of the membrane of the load sensor of FIG. 6 is adjusted, with a 20° angled point load and a mesa having a height of 200 µm.

Membrane thickness was also established to have an effect on shear and normal device sensitivity. Simulation of a load sensor 10 with a 200×ø300 µm cylindrical mesa 18 attached was performed to determine sensitivity while membrane thickness was varied. This produced the results shown in FIG. 8. A decrease in membrane 14 thickness was found to increase the normal and shear sensitivity as well as the $Y_S/N_S$ value. Decreasing the membrane 14 thickness also decreased the overall load range of the load sensor 10, indicating that mesa application may be a more desirable solution to increase the shear to normal sensitivity ratio.

Resistor and Load Application Location

Figure 9:
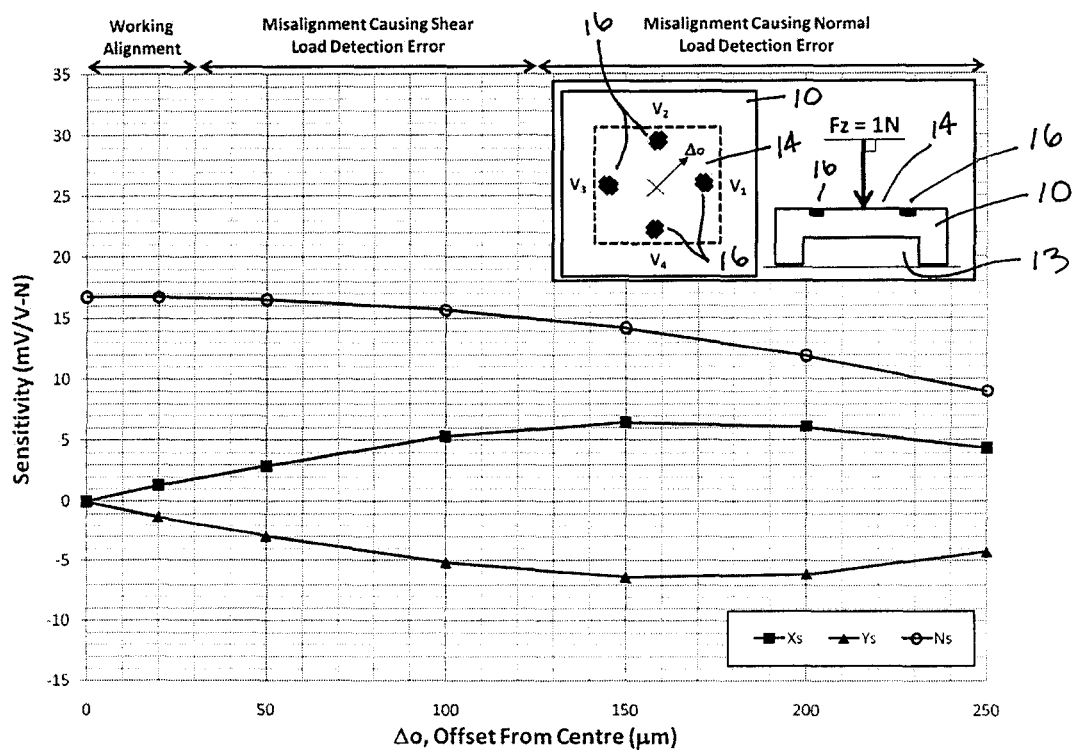
FIG. 9 is an X-Y graph depicting simulated sensitivity response due to moving a load closer to the corner between the V1 and V2 gauges of a load sensor.

Alignment of the applied load was an important parameter to study as misaligned load application was frequently encountered experimentally. Normal and shear sensitivity variation as the normal load application site is moved away from the center of the membrane 14 is shown in FIG. 9. This analysis found that the output from individual sensors increased as the load application site moved toward them on the membrane surface. This indicated that off-center load application could mask a change in force application angle if the shear sensitivity of a device was not high enough. Falsely detected shear sensitivity equivalent to 10% of the normal sensitivity was measured after 30 µm of misalignment. Misalignment beyond 125 µm caused greater than 10% distortion in detected normal load.

Figure 10:
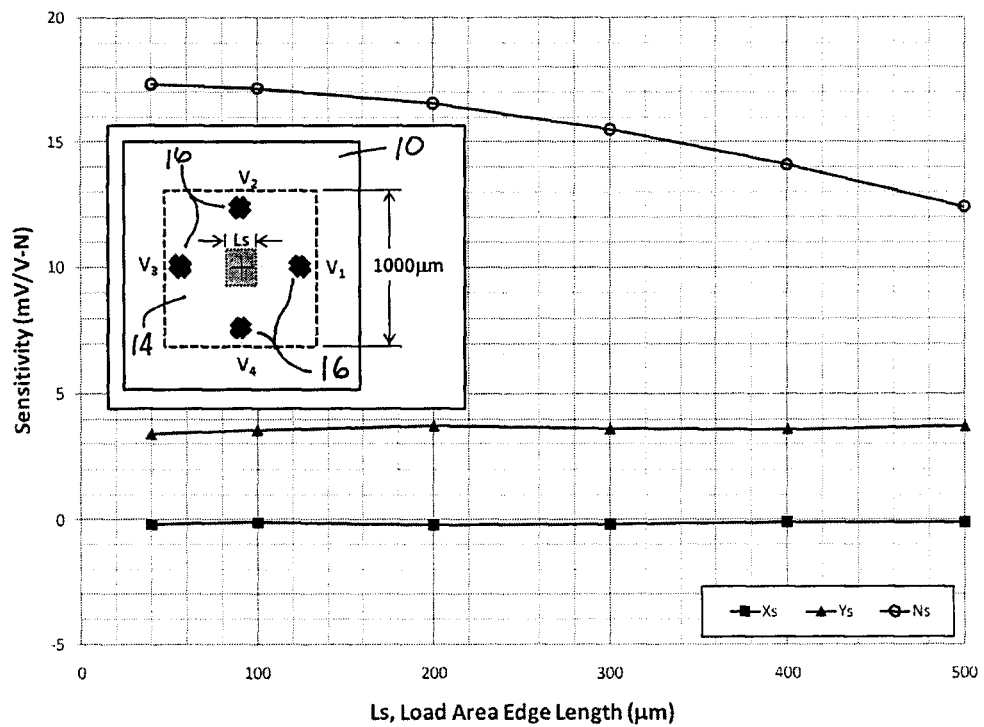
FIG. 10 is an X-Y graph depicting simulated sensitivity response as a load is distributed over a larger area on a load sensor.

Differentiation in the actual size of the applied load area was examined in terms of its effect on shear and normal sensitivity. This effect is shown in FIG. 10 for a 20° load of 5N distributed over a square application area, Ls, of varying edge length. As the load was distributed over a larger area, the normal sensitivity was reduced and the shear sensitivity was found to stay constant.

Figure 11:
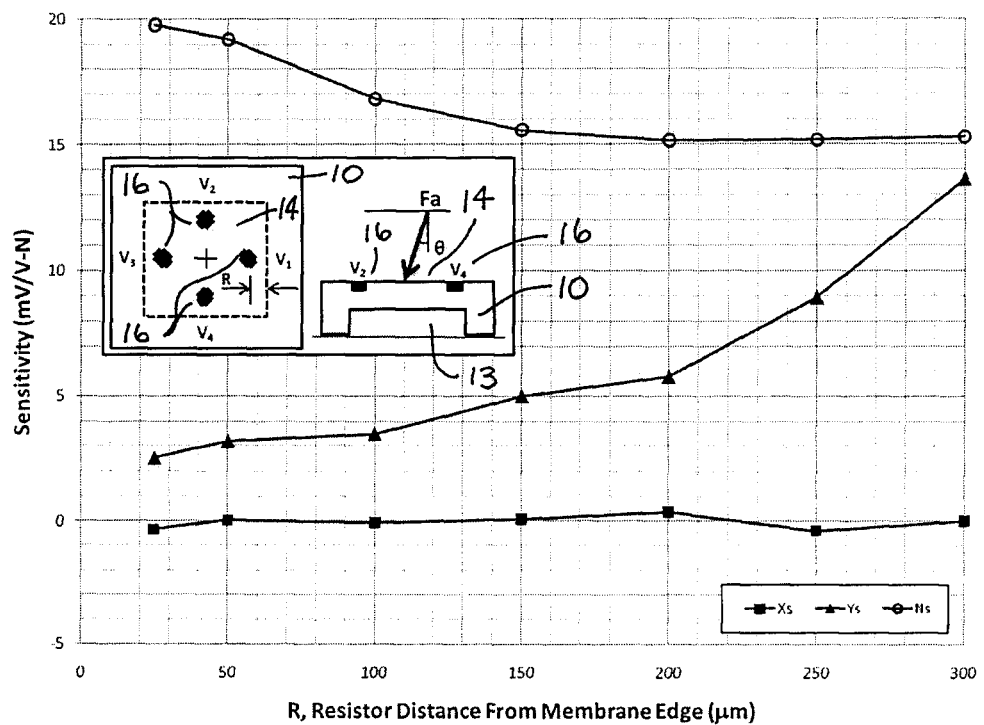
FIG. 11 is an X-Y graph depicting simulated sensitivity response as the piezoresistors are moved away from the edges on a load sensor.

Piezoresistive device or resistor location on the membrane surface 14 was also examined for its effect on sensitivity. An angled load, Fa, was applied to the membrane 14 surface as the resistors were moved inward from the membrane edges by a distance denoted by R. This relationship is shown in FIG. 11. This simulation determined that the normal sensitivity was decreased as the piezoresistive devices were moved away from the edges of the membrane. Conversely, the shear sensitivity was increased and greater shear to normal sensitivity ratios were achieved as the piezoresistive devices were moved away from the edges.

The shear sensitivity and normal sensitivity of a membrane-type piezoresistive sensor has been examined. In some embodiments, the shear to normal sensitivity ratio of a membrane type sensor can be increased by increasing the height of an attached mesa, making the membrane thinner or by optimizing the location of piezoresistors on the membrane. A manufacturing scheme has also been presented that allows adjustment of these parameters. Finding a balance between shear sensitivity, overall strength and load range is an application-specific concern, and varying parameters as described can allow the development of robust membrane sensors to detect normal and shear loads for tactile or interfacial applications.

Sensors were numerically evaluated using FEA. For sensors using square membranes with 1000 µm edge lengths, it was found that, in some embodiments, using a mesa on the surface of the membrane that was 200 µm in height required a membrane thickness of less than 100 µm to achieve sensors with $|Y_S/N_S|>0.5$. In other embodiments, $|Y_S/N_S|>0.5$ can be achieved using a mesa of approximately 150 µm when evaluating a membrane thickness of 65 µm. This amount of shear sensitivity was found to be detectable experimentally even considering experimental error sources.

Figure 12:
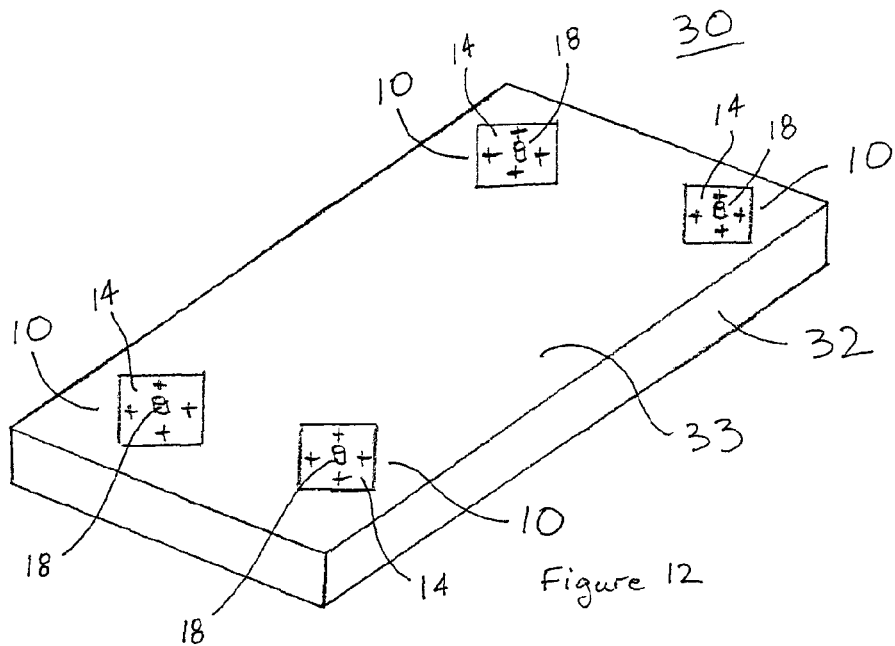
FIG. 12 is a perspective view depicting a load cell comprising four load sensors of FIG. 1b.

In some embodiments, a load cell can be provided by placing a plurality of load sensors on a substrate. Referring to FIG. 12, in some embodiments, load cell 30 can comprise substrate 32, which can be comprised of silicon or other suitable semiconductor materials as well known to those skilled in the art, further comprising a plurality of load sensors 10, as described herein, disposed on top surface 33 of substrate 32. In the illustrated embodiment, load cell 30 comprises four such load sensors 10, each sensor 10 comprising mesa 18 disposed on membrane 14. In some embodiments, load cell 30 can be configured to be disposed or placed on an object, wherein load cell 30 can be used to measure or detect external forces exerted on the object.

Figure 13:
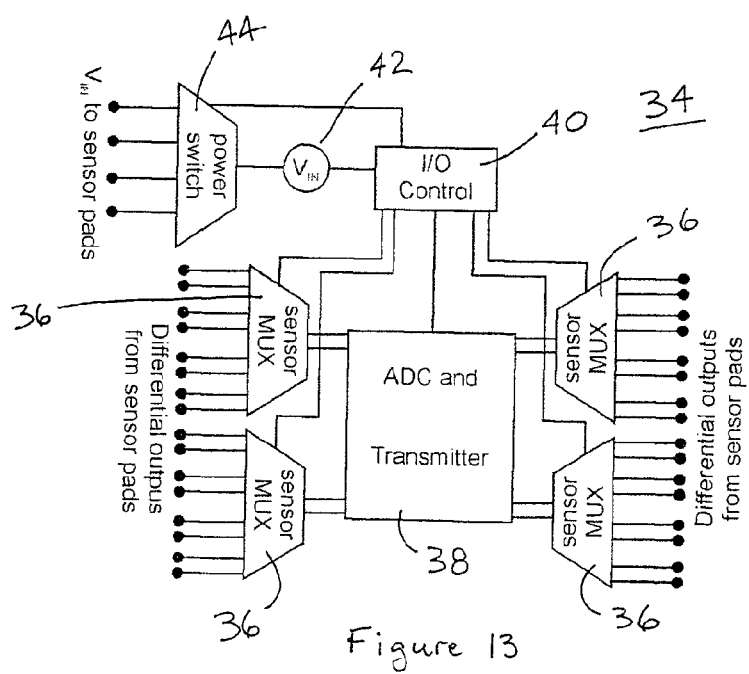
FIG. 13 is a block diagram depicting a multiplexing system for the load cell of FIG. 12.

In further embodiments, a load cell system for detecting loads in six axes can be provided by combining a load cell with means for combining or multiplexing the output voltages from the plurality of piezoresistive devices disposed on the load sensors within the load cell. Referring to FIG. 13, an embodiment of multiplexing ("MUX") system 34 is shown.

In some embodiments, multiplexing system 34 can comprise a plurality of sensor multiplexing ("MUX") units 36 to receive the output voltages from the piezoresistive devices disposed on load cells 10. MUX units 36 can be operatively coupled to input/output control unit 40 and to processor unit 38. Processor unit 38 can comprise analog to digital conversion means ("ADC") to digitize the output voltages from the piezoresistive devices. In some embodiments, processor unit 38 can further comprise transmitting or transceiving means to transmit data comprising information or data representing the digitized output voltages, as well known to those skilled in the art. MUX system 34 can further comprise power source 42 to provide power to input/output control unit 40 and/or processor unit 38. In some embodiments, power source can comprise a battery or other functionally equivalent means for providing power to MUX system 34 to enable it to operate. In some embodiments, MUX system 34 can further comprise power switch unit 44 that can distribute power from power source 42 to load sensors 10 to provide power to the piezoresistive devices disposed thereon. When a load cell 30 is placed on an object subject to a force exerted on the object, MUX system 34 can receive or collect the output voltages from the piezoresistive devices in the load sensors 10 disposed on load cell 30 and transmit information or data representing the output voltages to a computer or computing device configured to interpret the transmitted data and determine the load exerted on the object in six axes: the normal loads in each of the x, y and z axes; and the moments about each of the x, y and z axes.

Although a few embodiments have been shown and described, it will be appreciated by those skilled in the art that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

REFERENCES

The following documents are hereby incorporated by reference into this application in their entirety.

[1] M. S. Bartsch, W. Federle, R. J. Full, and T. W. Kenny, "A multiaxis force sensor for the study of insect biomechanics," *Journal of Microelectromechanical Systems*, vol. 16, pp. 709-718, June 2007.
[2] C. C. Chang, C. T. Lieu, and M. K. Hsieh, "Study of the fabrication of a silicon pressure sensor," *International Journal of Electronics*, vol. 82, pp. 295-302, March 1997.
[3] Z. Chu, P. M. Sarro, and S. Middelhoek, "Silicon three-axial tactile sensor," *Sensors and Actuators a-Physical*, vol. 54, pp. 505-510, June 1996.
[4] H. E. Elgamel, "Closed-form expressions for the relationships between stress, diaphragm deflection, and resistance change with pressure in silicon piezoresistive pressure sensors," *Sensors and Actuators a-Physical*, vol. 50, pp. 17-22, 1995.
[5] M. C. Hsieh, Y. K. Fang, M. S. Ju, G. S. Chen, J. J. Ho, C. H. Yang, P. M. Wu, G. S. Wu, and T. Y. F. Chen, "A contact-type piezoresistive micro-shear stress sensor for above-knee prosthesis application," *Journal of Microelectromechanical Systems*, vol. 10, pp. 121-127, March 2001.
[6] W. L. Jin and C. D. Mote, "Development and calibration of a sub-millimeter three-component force sensor," *Sensors and Actuators a-Physical*, vol. 65, pp. 89-94, Feb. 15, 1998.
[7] B. J. Kane, M. R. Kutkosky, and G. T. A. Kovacs, "A traction stress sensor array for use in high-resolution robotic tactile imaging," *Journal of Microelectromechanical Systems*, vol. 9, pp. 425-433, 2000.
[8] L. W. Lin and W. J. Yun, "Design, optimization and fabrication of surface micromachined pressure sensors," *Mechatronics*, vol. 8, pp. 505-519, August 1998.
[9] Y. Matsuoka, Y. Yamamoto, M. Tanabe, S. Shimada, K. Yamada, A. Yasukawa, and H. Matsuzaka, "Low-Pressure Measurement Limits for Silicon Piezoresistive Circular Diaphragm Sensors," *Journal of Micromechanics and Microengineering*, vol. 5, pp. 32-35, March 1995.
[10] Y. Matsuoka, Y. Yamamoto, K. Yamada, S. Shimada, M. Tanabe, A. Yasukawa, and H. Matsuzaka, "Characteristic Analysis of a Pressure Sensor Using the Silicon Piezoresistance Effect for High-Pressure Measurements," *Journal of Micromechanics and Microengineering*, vol. 5, pp. 25-31, March 1995.
[11] T. Mei, W. J. Li, Y. Ge, Y. Chen, L. Ni, and M. H. Chan, "An integrated MEMS three-dimensional tactile sensor with large force range," *Sensors and Actuators a-Physical*, vol. 80, pp. 155-162, Mar. 10, 2000.
[12] A. Tibrewala, A. Phataralaoha, and S. Buttgenbach, "Development, fabrication and characterization of a 3D tactile sensor," *Journal of Micromechanics and Microengineering*, vol. 19, p. 125005 (5 pp), December 2009.
[13] L. Wang and D. J. Beebe, "A silicon-based shear force sensor: development and characterization," *Sensors and Actuators a-Physical*, vol. 84, pp. 33-44, Aug. 1, 2000.
[14] L. Wang and D. J. Beebe, "Characterization of a silicon-based shear-force sensor on human subjects," *Ieee Transactions on Biomedical Engineering*, vol. 49, pp. 1340-1347, November 2002.
[15] L. Beccai, S. Roccella, A. Arena, F. Valvo, P. Valdastri, A. Menciassi, M. C. Carrozza, and P. Dario, "Design and fabrication of a hybrid silicon three-axial force sensor for biomechanical applications," *Sensors and Actuators a-Physical*, vol. 120, pp. 370-382, May 17, 2005.
[16] J. Dargahi, "A piezoelectric tactile sensor with three sensing elements for robotic, endoscopic and prosthetic applications," *Sensors and Actuators a-Physical*, vol. 80, pp. 23-30, Mar. 1, 2000.
[17] J. Dargahi, M. Parameswaran, and S. Payandeh, "A micromachined piezoelectric tactile sensor for an endoscopic grasper—Theory, fabrication and experiments," *Journal of Microelectromechanical Systems*, vol. 9, pp. 329-335, September 2000.
[18] W. L. Jin and C. D. Mote, "A six-component silicon micro force sensor,"*Sensors and Actuators a-Physical*, vol. 65, pp. 109-115, Mar. 15, 1998.
[19] P. Valdastri, S. Roccella, L. Beccai, E. Cattin, A. Menciassi, M. C. Carrozza, and P. Dario, "Characterization of a novel hybrid silicon three-axial force sensor," *Sensors and Actuators a-Physical*, vol. 123-124, pp. 249-257, Sep. 23, 2005.
[20] Z. Y. Chi and K. Shida, "A new multifunctional tactile sensor for three-dimensional force measurement," *Sensors and Actuators a-Physical*, vol. 111, pp. 172-179, Mar. 15, 2004.
[21] E. S. Hwang, J. H. Seo, and Y. J. Kim, "A polymer-based flexible tactile sensor for both normal and shear load detections and its application for robotics," *Journal of Microelectromechanical Systems*, vol. 16, pp. 556-563, June 2007.

[22] M. H. Bao, W. J. Qi, and Y. Wang, "Geometric Design Rules of 4-Terminal Gauge for Pressure Sensors," *Sensors and Actuators*, vol. 18, pp. 149-156. Jun. 15, 1989.

[23] Y. Kanda, "Optimum Design Considerations for Silicon Pressure Sensors Using a 4-Terminal Gauge," *Sensors and Actuators*, vol. 4, pp. 199-206, 1983.

[24] A. V. Gridchin and V. A. Gridchin, "The four-terminal piezotransducer: theory and comparison with piezoresistive bridge," *Sensors and Actuators a-Physical*, vol. 58, pp. 219-223, March 1997.

[25] F. Bordoni and A. Damico, "Noise in Sensors," *Sensors and Actuators a-Physical*, vol. 21, pp. 17-24, February 1990.

[26] J. A. Harley and T. W. Kenny, "1/F noise considerations for the design and process optimization of piezoresistive cantilevers," *Journal of Microelectromechanical Systems*, vol. 9, pp. 226-235, June 2000.

[27] D. Benfield, E. Lou, and W. Moussa, "Development of a MEMS-based sensor array to characterise in situ loads during scoliosis correction surgery," *Computer Methods in Biomechanics and Biomedical Engineering*, vol. 11, pp. 335-350, August 2008.

[28] J. C. Irvin, "Resistivity of Bulk Silicon and of Diffused Layers in Silicon,"*Bell System Technical Journal*, vol. 41, pp. 387-410, 1962.

[29] M. G. Buehler, S. D. Grant, and W. R. Thurber, "Bridge and Van-Der-Pauw Sheet Resistors for Characterizing Line-Width of Conducting Layers," *Journal of the Electrochemical Society*, vol. 125, pp. 650-654, 1978.

[30] M. G. Buehler and W. R. Thurber, "Experimental-Study of Various Cross Sheet Resistor Test Structures," *Journal of the Electrochemical Society*, vol. 125, pp. 645-650, 1978.

[31] S. J. Proctor, L. W. Linholm, and J. A. Mazer, "Direct Measurements of Interfacial Contact Resistance, End Contact Resistance, and Interfacial Contact Layer Uniformity," *Ieee Transactions on Electron Devices*, vol. 30, pp. 1535-1542, 1983.

[32] S. P. Timoshenko and S. Woinowsky-Krieger, "Theory of Plates and Shells (2nd Edition)," McGraw-Hill, pp. 197-205.

[33] A. Tibrewala, E. Peiner, R. Bandorf, S. Biehl, and H. Luthje, "Piezoresistive gauge factor of hydrogenated amorphous carbon films," *Journal of Micromechanics and Microengineering*, vol. 16, pp. S75-S81, June 2006.

We claim:

1. A microelectromechanical system ("MEMS") load sensor for detecting loads in three axes, the load sensor comprising:
   a) a flexible n-type silicon membrane substrate comprising a top surface; and
   b) a plurality of piezoresistive devices disposed on the top surface, wherein one or more of the plurality of piezoresistive devices comprise a four terminal piezoresistive gauge, the piezoresistive devices disposed in a spaced-apart configuration around a perimeter of the top surface, each piezoresistive device configured to produce an output voltage, wherein one or more of the plurality of piezoresistive devices are further comprised of p-type silicon.

2. The load sensor as set forth in claim 1, further comprising a mesa disposed on the top surface.

3. The load sensor as set forth in claim 2, wherein the mesa is disposed substantially equidistant from each of the plurality of piezoresistive devices.

4. The load sensor as set forth in claim 2, wherein the mesa further comprises a rectangular solid member.

5. The load sensor as set forth in claim 2, wherein the mesa further comprises a cylindrical solid member.

6. The load sensor as set forth in claim 1, wherein the membrane substrate is rectangular thereby defining four edges, and wherein the plurality of piezoresistive devices is further comprised of four piezoresistive devices disposed about the perimeter of the membrane substrate, each piezoresistive device disposed substantially near the middle of each edge.

7. The load sensor as set forth in claim 1, wherein one or more of the plurality of piezoresistive devices further comprise a two-terminal piezoresistor.

8. A load cell for detecting loads in six axes, the load cell comprising:
   a) a load cell substrate configured for disposition on an object;
   b) a plurality of microelectromechanical system ("MEMS") load sensors for detecting loads in three axes disposed on the load cell substrate, each load sensor further comprising:
      i) a flexible n-type silicon membrane substrate comprising a top surface, and
      ii) a plurality of piezoresistive devices disposed on the top surface, the piezoresistive devices disposed in a spaced-apart configuration around a perimeter of the top surface, each piezoresistive device configured to produce an output voltage, wherein one or more of the plurality of piezoresistive devices are further comprised of p-type silicon.

9. The load cell as set forth in claim 8, wherein one or more load sensors further comprise a mesa disposed on the top surface.

10. The load cell as set forth in claim 9, wherein the mesa is disposed substantially equidistant from each of the plurality of piezoresistive devices of the one or more load sensors.

11. The load cell as set forth in claim 9, wherein the mesa further comprises a rectangular solid member.

12. The load cell as set forth in claim 9, wherein the mesa further comprises a cylindrical solid member.

13. The load cell as set forth in claim 8, wherein the membrane substrate is rectangular thereby defining four edges, and wherein the plurality of piezoresistive devices is further comprised of four piezoresistive devices disposed about the perimeter of the membrane substrate, each piezoresistive sensor disposed substantially near the middle of each edge.

14. The load cell as set forth in claim 8, wherein the load cell substrate is comprised of silicon.

15. A load cell system for detecting loads in six axes, the system comprising:
   a) a load cell substrate configured for disposition on an object;
   b) a plurality of microelectromechanical system ("MEMS") load sensors for detecting loads in three axes disposed on the load cell substrate, each load sensor further comprising:
      i) a flexible n-type silicon membrane substrate comprising a top surface, and
      ii) a plurality of piezoresistive devices disposed on the top surface, the piezoresistive devices disposed in a spaced-apart configuration around a perimeter of the top surface, each piezoresistive device configured to produce an output voltage, wherein one or more of the plurality of the piezoresistive devices are further comprised of p-type silicon; and c) means for combining or multiplexing the output voltages from the plurality of piezoresistive devices.

16. The system as set forth in claim 15, wherein the load cell substrate is comprised of silicon.

* * * * *